United States Patent
Doonan

(10) Patent No.: US 9,731,389 B2
(45) Date of Patent: Aug. 15, 2017

(54) HVAC FIRE DAMPER TOOL

(71) Applicant: Stephen Doonan, Sycamore, IL (US)

(72) Inventor: Stephen Doonan, Sycamore, IL (US)

(*) Notice: Subject to any disclaimer, the term of this patent is extended or adjusted under 35 U.S.C. 154(b) by 315 days.

(21) Appl. No.: 13/932,181

(22) Filed: Jul. 1, 2013

(65) Prior Publication Data
US 2014/0026380 A1    Jan. 30, 2014

Related U.S. Application Data

(60) Provisional application No. 61/677,195, filed on Jul. 30, 2012.

(51) Int. Cl.
*B23P 19/04* (2006.01)
*B25B 5/10* (2006.01)

(52) U.S. Cl.
CPC ............ *B23P 19/04* (2013.01); *B25B 5/103* (2013.01); *Y10T 29/53891* (2015.01)

(58) Field of Classification Search
None
See application file for complete search history.

(56) References Cited

U.S. PATENT DOCUMENTS

| | | | |
|---|---|---|---|
| 2,136,140 A * | 11/1938 | Langsner | 33/441 |
| 2,977,872 A * | 4/1961 | Allfree | 100/17 |
| 3,807,237 A | 4/1974 | Scharres | |
| 3,908,633 A | 9/1975 | Ammons | |
| 4,345,580 A | 8/1982 | Speicher | |
| 4,434,784 A | 3/1984 | Van Patten | |
| 4,596,234 A | 6/1986 | Cates | |
| 7,436,275 B2 * | 10/2008 | Dale | 333/255 |
| 8,266,774 B1 * | 9/2012 | Doty | 29/253 |

* cited by examiner

*Primary Examiner* — Joseph J Hail
*Assistant Examiner* — Brian Keller
(74) *Attorney, Agent, or Firm* — Global Intellectual Property Agency, LLC; Daniel Boudwin

(57) ABSTRACT

A fire damper tool is provided for assisting a user opening the shutters of an HVAC fire damper after the shutters have closed. The device comprises a scissor tool that is hand-driven for separating the closed shutters without requiring the user to exert force on the doors while opening. The tool comprises a first and second set of scissor arms connected to a common pin. A threaded rod connects the proximal ends of the scissor arms along one side of the pin, while the distal ends of the scissor arms are positioned between the closed fire damper doors. A hand driven nut draws the proximal ends of the scissor arms together, causing the proximal ends thereof to spread, and in turn spread the fire damper doors. The tool is useful for confined areas where mechanical advantage is necessary for separating items, and is particularly suited for commercial HVAC applications.

4 Claims, 3 Drawing Sheets

HVAC FIRE DAMPER TOOL

CROSS REFERENCE TO RELATED APPLICATION

This application claims the benefit of U.S. Provisional Application No. 61/677,195 filed on Jul. 30, 2012, entitled "Fire Damper Reset Tool." The above identified patent application is herein incorporated by reference in its entirety to provide continuity of disclosure.

BACKGROUND OF THE INVENTION

Field of the Invention

The present invention relates to HVAC systems and fire dampers. More specifically, the present invention pertains to a fire damper tool that is utilized to open a closed fire damper within an HVAC system, whereby the user is not required to open the damper by hand after activation.

Fire dampers are devices utilized largely in commercial environments to prevent the spread of fire through an HVAC system. The device acts as a passive fire protection device that closes the ductwork of a building's HVAC system to prevent smoke, heat, and flames from traveling therethrough and spreading the fire to different parts of a building. Generally these devices are a form of closing aperture or air valve that utilizes closing shutter blades to prevent smoke and the like from passing therethrough. Most are activated by way of heat or by way of an electrical system in communication with the building fire alarm.

Fire dampers, when activated, are sprung into a closed position that restricts air flow thereacross. While this serves as a functional means to prevent the spread of smoke and fire, opening these devices can be extremely difficult for HVAC workers and building maintenance personnel. Since most dampers are sprung into a closed position, simply prying the shutters into an open position requires considerable strength in an otherwise enclosed environment. HVAC ducts are generally confined areas that do not allow a worker to obtain sufficient leverage to open the fire damper without exerting considerable effort.

The present invention pertains to a new HVAC system tool that is specifically designed to open a closed fire damper. The device is a prying and spreading tool that comprises a pair of arcuate scissor arms connected at a common hinge point, along with a hand-adjustable scissor threaded rod. The rod acts on the proximal ends of the scissor arms, which in turn acts to spread the distal, working ends of the arms on the opposite side of the hinge point. The working ends are adapted to be placed between the closed members of the fire damper, whereby hand turning the scissor threaded rod pries the members apart for re-latching or otherwise securing the members in an open position. Tool is adapted for use by hand in the confined spaces.

Description of the Prior Art

Devices have been disclosed in the prior art that relate to fire dampers and tools therefor. These include devices that have been patented and published in patent application publications. The following is a list of devices deemed most relevant to the present disclosure, which are herein described for the purposes of highlighting and differentiating the unique aspects of the present invention, and further highlighting the drawbacks existing in the prior art.

Devices in the prior art largely relate to fireplace damper tools and articles for assisting residential users manipulate a fireplace damper. These are generally simple structures having a given design that is suited for the fireplace application. The present invention pertains to a scissor-type prying tool that separates the damper shutters or damper members based on rotational input on the tool. The device is hand operated and requires no additional tools to separate the damper while in operation.

One such device in the prior art is U.S. Pat. No. 3,908,633 to Ammons, which discloses an actuating tool for opening and closing a fireplace damper so as to operate the damper and to prevent fluttering of the damper caused by air movement within the fireplace. The tool comprises a shank, a foot, and a head region. The foot is perpendicular to the shank, while the head region is a two-sided grip for the user to grasp. The tool is adapted to open and close the damper, as well as remain wedged within the fireplace aperture to lock the damper in its closed position. The Ammons device, while useful for fireplaces, is a simple, static tool that is used for manipulating a specific type of damper.

Another device is U.S. Pat. No. 4,345,580 to Speicher, which discloses an attachment for a fireplace flue damper having a handle for adjusting the position of the damper within a fireplace. The device comprises an elongated channel, a carriage bolt, a force-applying wing nut, and side wall edges being serrated to grip the handle. While providing a tool that allows one to see the open extent of a fireplace damper and adjust the same, the structure and purpose of the Speicher device diverges considerably with respect to the present HVAC fire damper tool.

Finally, U.S. Pat. No. 4,596,234 to Cates discloses another fireplace damper tool that can be used to manipulate the damper element without directly looking at the damper within the fireplace. The device comprises a bar handle, a damper-engaging crosspin, and a mirror unit that allows the user to see around a bend or into the fireplace behind the mantle. A light on the tool may further be provided, which in conjunction with the mirror allows for damper adjustment from outside of the fireplace and even while the fireplace is active. The Cates device, while useful in fireplaces, fails to disclose an HVAC damper reset tool or opening device as provided by the present invention.

The present invention pertains to a new and novel fire damper separation and opening tool, wherein an operator positions the device between the damper shutters for prying the same into an open position. The device is well adapted for commercial use in HVAC systems, where a fire damper needs to be reset after a fire alarm or fire event to return the HVAC system to a working state.

It is submitted that the present invention is substantially divergent in design elements from the prior art, and consequently it is clear that there is a need in the art for an improvement to existing HVAC fire damper tool devices. In this regard the instant invention substantially fulfills these needs.

SUMMARY OF THE INVENTION

In view of the foregoing disadvantages inherent in the known types of fire damper tools now present in the prior art, the present invention provides a new scissor-type, fire damper spreading tool that can be utilized for providing convenience for the user when spreading otherwise closed fire damper doors in an HVAC duct.

It is therefore an object of the present invention to provide a new and improved fire damper tool that has all of the advantages of the prior art and none of the disadvantages.

It is another object of the present invention to provide a fire damper tool that can separate a closed fire damper to reset the damper after activation, wherein the separation is facilitated with significantly greater mechanical advantage than existing methods.

Another object of the present invention is to provide a fire damper tool that is particularly suited for commercial HVAC ducts and for opening closed fire dampers in confined areas.

Yet another object of the present invention is to provide a fire damper tool that can be operated by hand and without an additional tool.

Another object of the present invention is to provide a fire damper tool that does not damage the shutters or doors of a fire damper while opening.

Another object of the present invention is to provide a fire damper tool that can be manufactured in a number of different sizes to suit the given application and fire damper size.

A final object of the present invention is to provide a fire damper tool that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
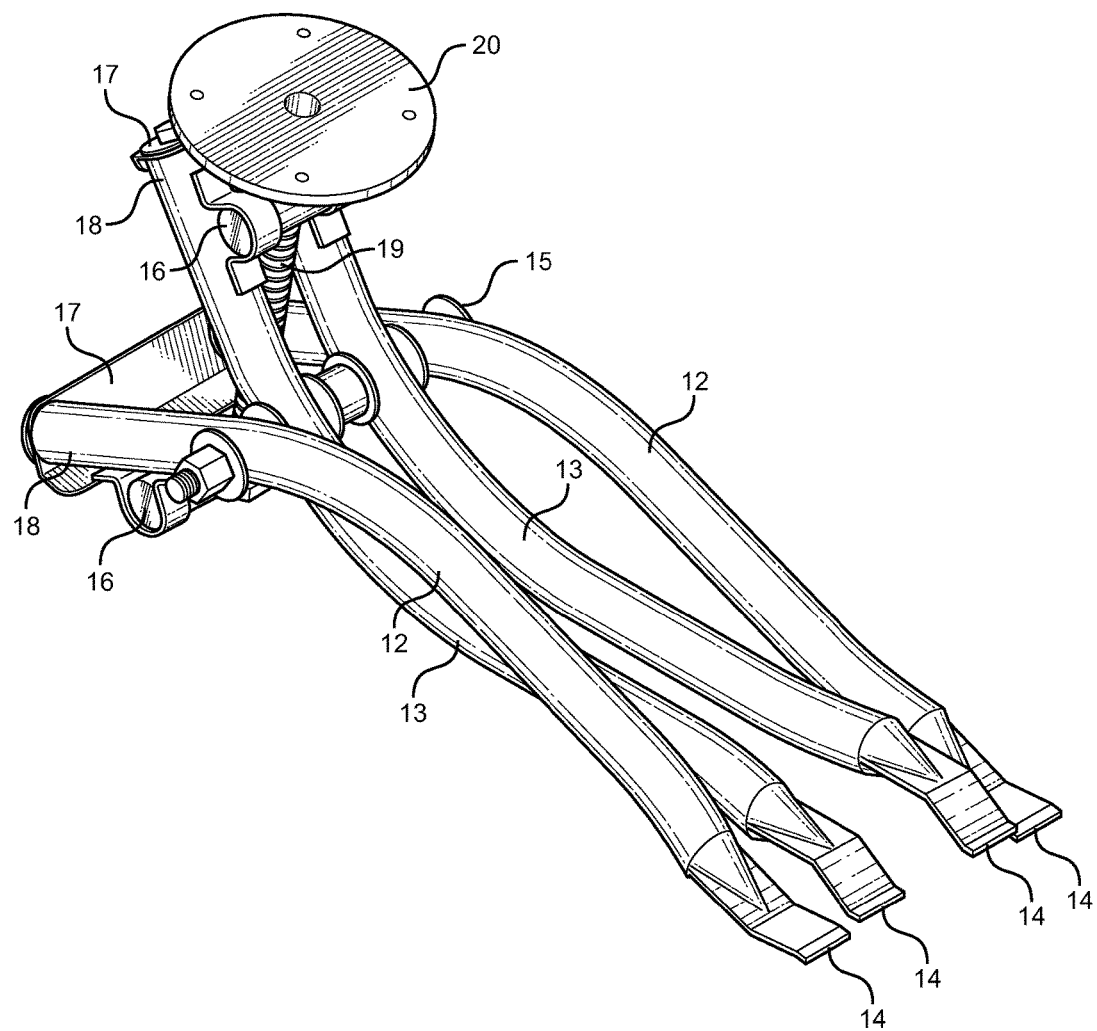
FIG. 1 shows an overhead perspective view of the fire damper tool of the present invention.

Reference is made herein to the attached drawings. Like reference numerals are used throughout the drawings to depict like or similar elements of the fire damper tool. For the purposes of presenting a brief and clear description of the present invention, the preferred embodiment will be discussed as used for separating the shutter doors of a fire damper with greater mechanical advantage over existing methods. The figures are intended for representative purposes only and should not be considered to be limiting in any respect.

Referring now to FIG. 1, there is shown a perspective view of the fire damper tool of the present invention in an exemplary embodiment. The device comprises a first 12 and second 13 pair of scissor arms that are connected to each other about a pin connection 15 that allows rotation of each pair of scissor arms with respect to one another. Each of the scissor arms comprise elongated, arcuate members having a proximal end 18 along one side of the pin connection 15, and a distal working end 14 on an opposite side of the pin connection 15.

The distal working end 14 of the scissor arms comprises a flattened member that is adapted to be positioned between two fire damper doors when in a closed position. The proximal end 18 of the scissor arm pairs are secured together using a link 17, which ensures the first scissor arm pair 12 and second scissor arm pair 13 travel in unison, while the two pairs can be rotated relative to one another about the pin joint 15. Controlling the motion of the scissor arms is a threaded rod 19, which secures to the proximal end 18 of each scissor pair by way of an apertured cross brace 16 member. The threaded rod 19 extends through the aperture in each cross brace 16 and acts thereupon to draw the proximal ends 18 of each scissors arm pair together. During this action, the distal ends 14 of each scissor arm pair along the opposite side of the pin connection 16 separate.

The threaded rod 19 comprises an elongated member having external threads, wherein the lowermost portion of rod includes a welded nut or flange that prevents pull-through of the rod 19 through the lowermost cross brace 16. The rod 19 feeds through the upper cross brace 16 and is threadably connected to a turn nut 20. The turn nut 20 acts on a washer and presses against the upper cross brace 16, which in turn causes the lowermost flange of the rod 19 to bear against the lower cross brace 16. This action draws the proximal ends 18 of the scissor arms together, which move together and affect a widening action between the distal ends 14 of the scissor arm pairs.

Figure 2:
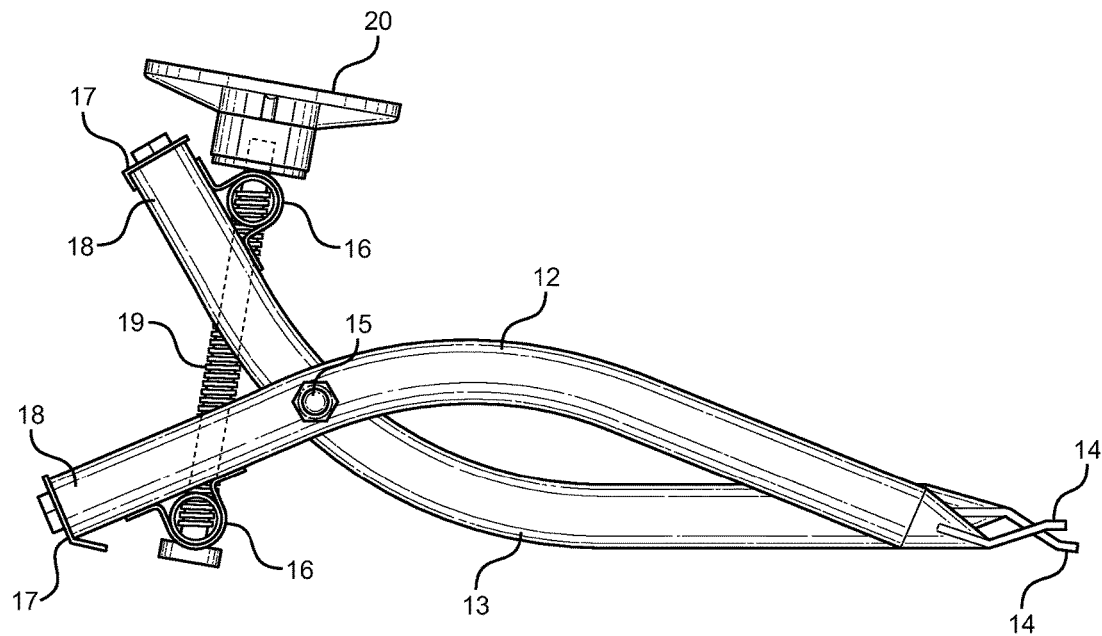
FIG. 2 shows a side view of the fire damper tool.
Figure 3:
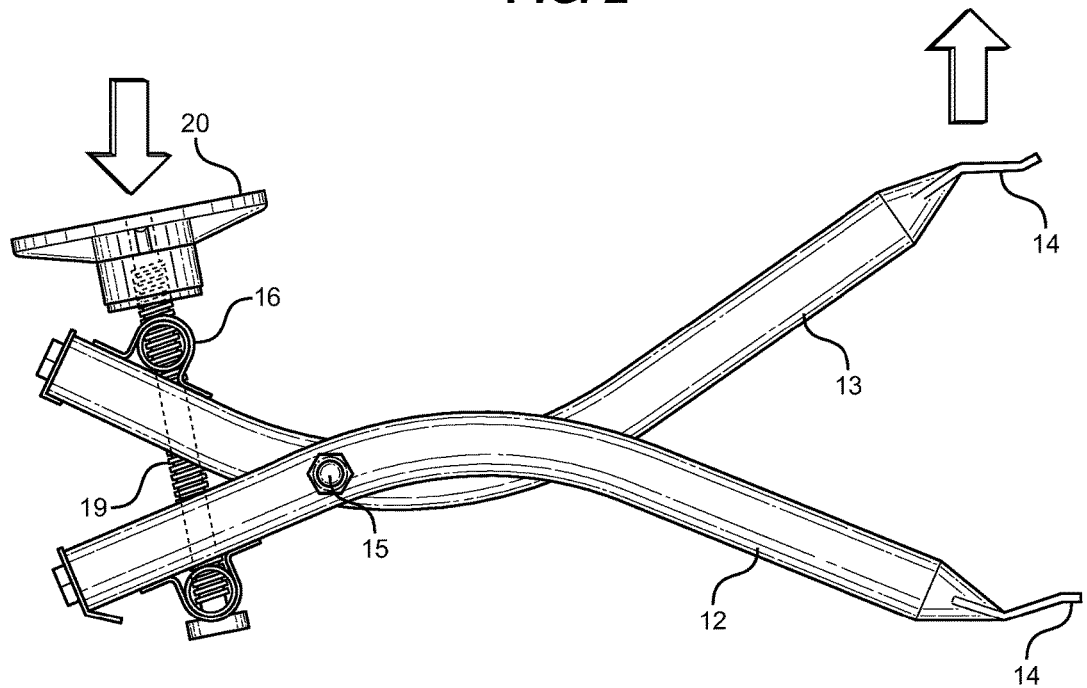
FIG. 3 shows a side view of the fire damper tool being spread apart.

Referring now to FIGS. 2 and 3, there are shown side views of the fire damper tool of the present invention. The scissor arm pairs function in unison during operation of the tool, whereby the proximal end link 17 secures the arms together and ensure the distal ends of each pair remain in the same plane and travel the same arc at the same time. The pin 15 allows the threaded rod 19 to separate the distal ends 14 of each arm pair, while the elongated length of the arms between their distal end 14 and the pin 15 allow the distal ends to separate significantly with only a short separation between the proximal ends thereof. In this way, the device acts as a scissor tool, wherein the threaded rod 19 acts to separate the scissor arms and thus separate the opposing shutter doors of a closed fire damper.

The turn nut 20 along the upper portion of the threaded rod 19 allows a user to compress together the proximal end 18 of the scissor arms 12, 13 without using an external tool. The turn nut 20 comprises an enlarged disc with a central, threaded aperture adapted to threadably connect to the threaded rod 19. The enlarged surface of the turn nut 20 allows a user to grip the same and impart a torque thereon, thereby driving the scissor arms together along one side and separating the scissor arms along an opposite end. The distal ends 14 separate a closed fire damper door that has been activated or closed in an HVAC duct.

Figure 4:
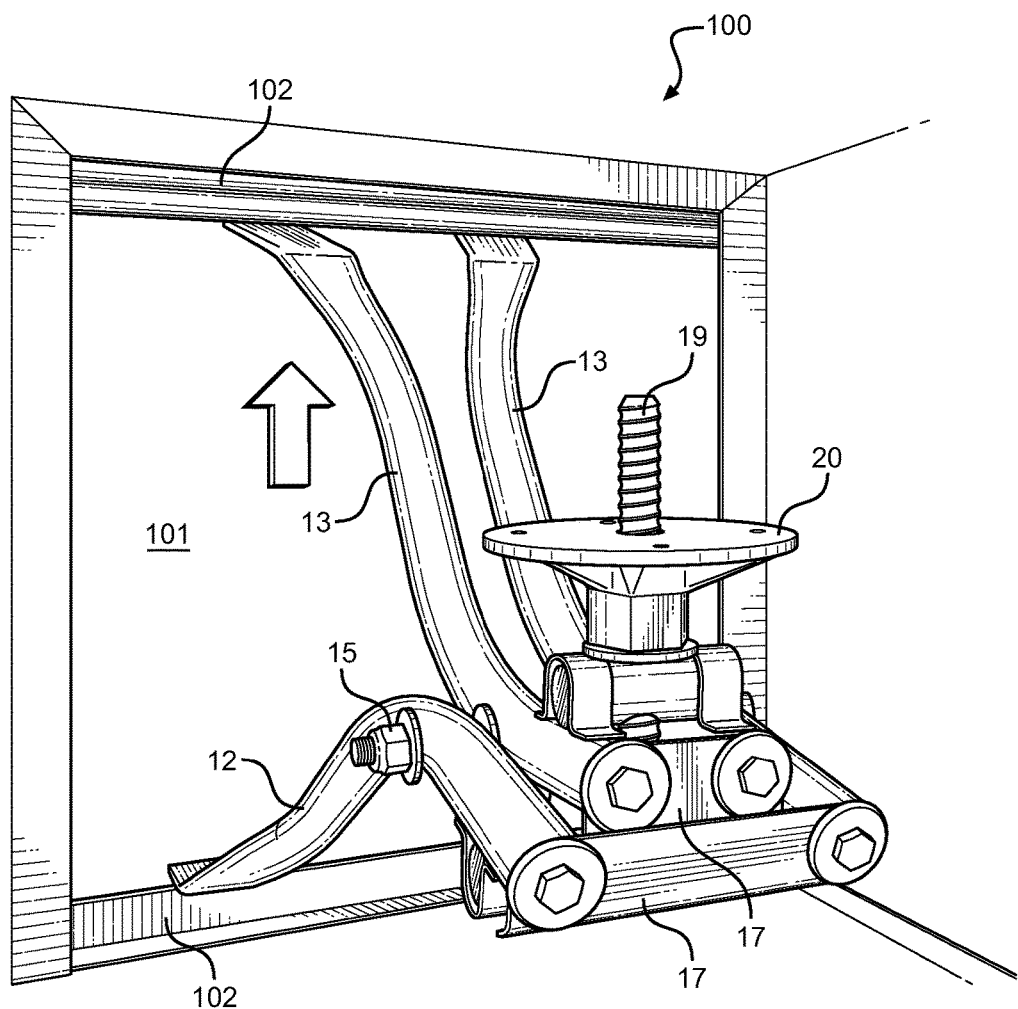
FIG. 4 shows a view of the fire damper tool in a working state, separating the shutter doors of a fire damper within an HVAC duct.

Referring now to FIG. 4, there is shown a view of the fire damper tool of the present invention in a working state, separating the shutter doors 102 of a fire damper 101 within an HVAC duct. The tool of the present invention represents an improved means of separating an HVAC duct fire damper, where the user is not required to manually pry the doors 102 apart when resetting the fire damper after activation thereof. The scissor arms 12,13 of the device and its construction allow the user to obtain a significant mechanical advantage when prying apart the fire damper doors 102. The placement of such dampers in HVAC ducting 100 makes maneuvering therein a particular problem. The construction and operation of the present invention significantly improves the user's ability to function in such confined areas and apply the requiring prying load on the damper doors 102.

Fire damper locations can often be difficult to reach, which in turn makes them harder to open them after being triggered. Typically, to properly facilitate the opening procedure, operators must manually open a fire damper without the use of tools, which can consume time, require considerable effort and in turn cost money. The present invention provides a tool for opening a fire damper in a building system, such as an HVAC system. The device comprises a hand driven, scissor-type prying device comprised of galvanized metal tubing that can readily operate the fire damper curtain or shutter doors. The device can be used to replace a fire damper fusable link, and can also open a closed fire damper. The device is powered by a threaded rod that the operator can manipulate with one hand and without looking at the installed fire damper. Municipal code inspectors and building maintenance personnel may find the present invention to be a helpful resource.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fire damper tool, comprising:
    a first pair of scissor arms including a first elongated arcuate arm and a second elongated arcuate arm, the first and second elongated arcuate arms including a proximal end and a distal end;
    a second pair of scissor arms including a first elongated arcuate arm and a second elongated arcuate arm, the first and second elongated arcuate arms including a proximal end and a distal end;
    a first link connecting a most terminal end of the proximal end of the first elongated arcuate arm of the first pair of scissor arms and a most terminal end of the proximal end of the second elongated arcuate arm of the first pair of scissor arms, such that the first and second elongated arcuate arms are aligned, the first link secured to each of the most terminal ends of the first and second elongated arcuate arms of the first pair of scissor arms via a fastener;
    a second link connecting a most terminal end of the proximal end of the first elongated arcuate arm of the second pair of scissor arms and a most terminal end of the proximal end of the second elongated arcuate arm of the second pair of scissor arms, such that the first and second elongated arcuate arms are aligned, the second link secured to each of the most terminal ends of the first and second elongated arcuate arms of the second pair of scissor arms via a fastener;
    a flattened member disposed on each of the distal ends of the first and second elongated arcuate arms of the first pair of scissor arms and the distal ends of the first and second elongated arcuate arms of the second pair of scissor arms;
    a pin joint rotatably coupling the first pair of scissor arms to the second pair of scissor arms, the pin joint disposed between the proximal ends and the distal ends of the first and second elongated arcuate arms of the first and second pair of scissor arms;
    a first cross brace member coupling the proximal ends of the first and second elongated arcuate arms of the first pair of scissor arms, the first cross brace member including an aperture;
    wherein the first cross brace is affixed to a concave surface of the proximal ends of the first and second elongated arcuate arms of the first pair of scissor arms;
    a second cross brace member coupling the proximal ends of the first and second elongated arcuate arms of the second pair of scissor arms, the second cross brace member including an aperture;
    wherein the second cross brace is affixed to a concave surface of the proximal ends of the first and second elongated arcuate arms of the second pair of scissor arms;
    a threaded rod positioned through the apertures of the first and second cross brace members, the threaded rod including threads disposed along its longitudinal length, a flanged lower end, and an upper end;
    a turn nut threadably coupled to the upper end of the threaded rod, the threaded nut configured to threadably engage the threads of the threaded rod and translate vertically along the longitudinal length of the threaded rod.

2. The fire damper tool of claim 1, wherein the turn nut engages the second pair of scissors arms upon vertical translation towards the flanged lower end of the threaded rod and applies a force thereto, thereby drawing the proximal ends of the first and second elongated arcuate arms of the first pair of scissor arms and the proximal ends of the first and second elongated arcuate arms of the second pair of scissor arms together and separating the distal ends of the first and second elongated arcuate arms of the first pair of scissor arms from the distal ends of the first and second elongated arcuate arms of the second pair of scissor arms.

3. The fire damper tool of claim 1, wherein the first cross brace is disposed between the first link and the pin joint.

4. The fire damper tool of claim 1, wherein the second cross brace is disposed between the second link and the pin joint.

* * * * *